June 14, 1932. C. E. SUMMERS 1,862,724
LUBRICATING SYSTEM
Filed Jan. 9, 1931

Inventor
Caleb E. Summers
By Blackmore, Spencer & Flint
Attorneys

Patented June 14, 1932

1,862,724

UNITED STATES PATENT OFFICE

CALEB E. SUMMERS, OF PONTIAC, MICHIGAN, ASSIGNOR TO GENERAL MOTORS CORPORATION, OF DETROIT, MICHIGAN, A CORPORATION OF DELAWARE

LUBRICATING SYSTEM

Application filed January 9, 1931. Serial No. 507,558.

This invention relates, in a limited sense, to force feed lubricating systems for internal combustion engines and particularly to an arrangement of oil delivery passages or holes in the engine crank-shaft, although, broadly, the invention is not necessarily limited in its application to any special type of engine or machinery.

In the conventional engine lubrication system oil under pressure is supplied from a crankcase or sump by an engine driven pump through a manifold having suitable branches leading to the crankshaft main bearings. In order to supply lubricant to the connecting rod bearings on the crank pins as well as the journal or main bearings, the crankshaft is usually provided with passages or oil holes leading from each main bearing to one or more adjacent crank pins. Generally, such oil passages consist of communicating holes drilled one through the crank pin and journal in the general direction of and offset from the longitudinal axis of the shaft and others through the crank pin and journal in a direction that intersects the axis of the shaft. Thus oil supplied at the main bearing can flow into the radial journal passage which is preferably arranged so as to be alined with the delivery branch of the manifold, once for each shaft revolution and then through the longitudinal passage and out the hole extending radially outward at the crank pin to lubricate the connecting rod bearing. The system is sometimes extended further by drilling a passageway in the connecting rod to lead oil to the piston pin bearing.

In a construction of this general sort the indications are that any dirt or heavy foreign particles suspended in the oil flowing through the off center longitudinal hole is thrown outwardly by centrifugal force against the outermost side of the passage and washed along until it reaches and enters the radial hole in the crank pin. If such foreign matter contains metal dust or other hard gritty abrasive substances the connecting rod bearings suffer undue wear and become scratched or scored.

When two or more radial holes are located in each crank pin, as would be desirable if more than one connecting rod bears on the same pin, as is the case in the ordinary V-type engine, it is found that the bearing surface at the outlet hole closest the source of supply is the one which shows the greatest wear. This, it appears, is because the first radial outlet receives practically all of the heavier parts thrown out and washed along the far side of the longitudinal passageway. As further bearing out this conclusion it may be stated that if the dirt content of the lubricant is high and there is a tendency toward deposition and accumulation of dirt in the oil passages, it is usually the first radial outlet hole which is obstructed and clogged the worst.

As a practical matter commercial lubricating oil seldom contains harmful particles and any abrasive substances in it are usually those picked up in the engine crankcase, particularly when the engine is new and during the initial hundred or so hours of operation. Such impurities may consist, for example, of metal dust and chips resulting from machining operations and clinging to the various parts in spite of the tumbling and other cleaning methods resorted to at the time of manufacture. While the quantity of harmful ingredients may be comparatively small, nevertheless materially longer bearing life can be observed if impurities are collected and kept away from the bearing surfaces.

To accomplish this end is one of the primary objects of the present invention and a preferred embodiment thereof involves the location of the outlet hole in the crank pin leading to the connecting rod bearing at a point spaced from the outer side of the longitudinal passage so that the heavier parts thrown outwardly will wash on past the outlet and become separated from the oil stream and permanently entrapped. This specific construction will be hereinafter described with reference to the accompanying drawing in which Figure 1 is a fragmentary side elevation of an internal combustion engine with parts broken away and shown in section.

Figure 1:
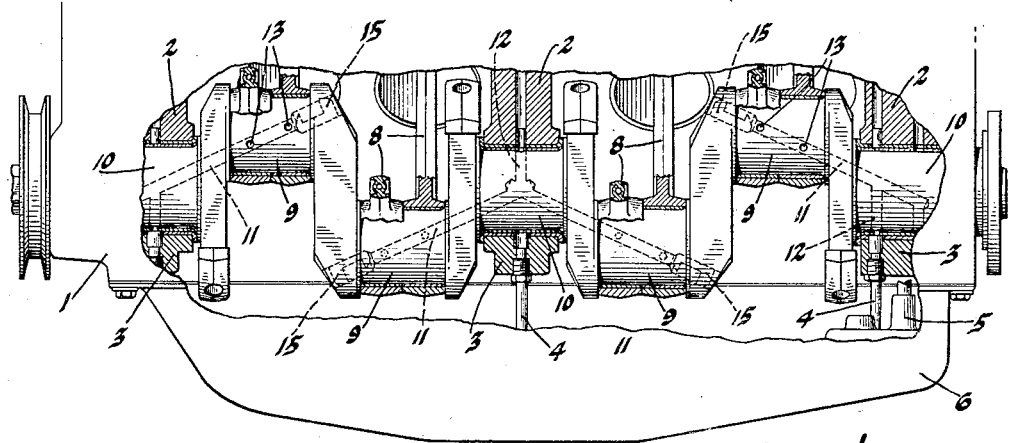

Referring to the drawing, the reference numeral 1 indicates an engine crankcase having a group of transverse webs or walls 2 which provide, in cooperation with removable bearing caps 3, the main bearing in which the crankshaft rotates. Each bearing cap is provided with a drilled passageway connected with a branch line 4 of an oil delivery manifold associated with an engine driven pump 5 which delivers oil under pressure from the oil pan 6 to the main bearings.

The engine illustrated is an eight-cylinder, V-type, having two banks of four cylinders each, arranged in angular relation with pistons in opposite cylinders connected by rods 8 to the same throw or crank of the shaft so that adjacent connecting rods are arranged in pairs side by side on the crank pins. Thus the crankshaft is shown as having four throws and three journals or main bearings. Extending through each crank pin 9 and an adjacent journal 10 is a longitudinal passageway 11 drilled through the parts at an acute angle to the axis of rotation. Intersecting this passageway is a radial hole 12 drilled through the main journal preferably on a radial line for alinement with oil delivery branch line 4 connected with the associated bearing cap 3. Each crank pin is shown in the drawing as provided with two holes 13, one for each connecting rod bearing, and each hole is drilled at an angle to the radial line and communicates with the longitudinal passage 11 at a point spaced from the outermost side thereof.

The outer end of the passage 11 is preferably closed as by means of the plug 15. This plug 15 has an intermediate portion cut away by a milling operation to provide a clearance space 16, the innermost wall of which is cut away at one side and provided with an inclined surface 17 which cooperates with an adjacent portion of the passageway to provide a baffled or restricted mouth leading into the clearance space or pocket 16. The plug may have a close fit in the passageway to secure it in place or it may carry screw threads to facilitate removal. In its outer end a screw threaded aperture 18 may be provided for the engagement of a suitable tool for the manipulation thereof.

Since the outlet openings 13 extend laterally to the direction of centrifugal force upon crankshaft rotation it will be apparent that any foreign matter suspended in oil flowing through the passage 11 and thrown against the outer side thereof will wash on past the outlet, separating out of the oil and eventually entering the restricted mouth and into the trap provided by the space 16 of the closure plug. In this fashion the connecting rod bearing surfaces will be protected from the harmful effects of the dirt and given a longer life.

Figure 2:
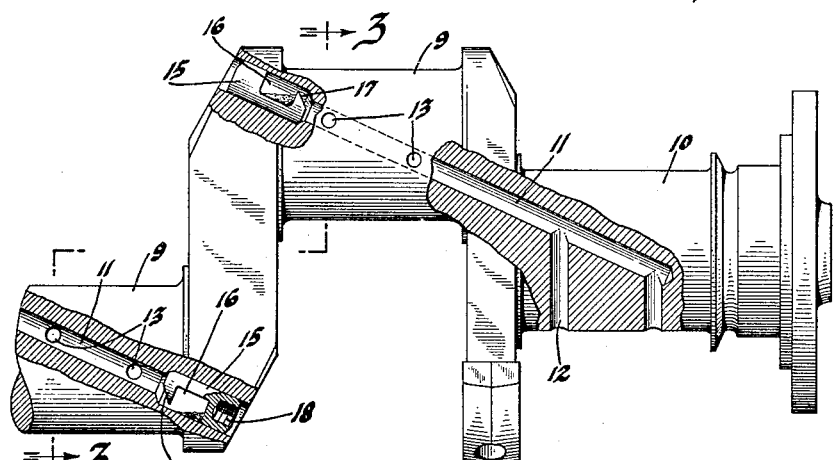
Figure 2 is a view partly in section of an end portion of a crankshaft.
Figure 3:
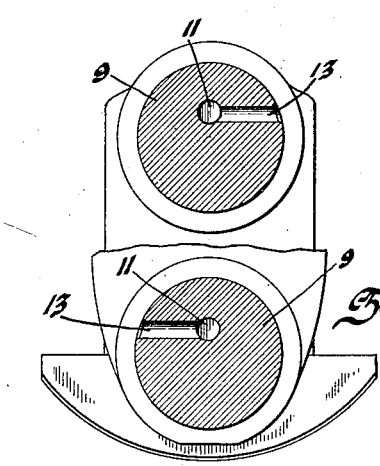
Figure 3 is a section taken on line 3—3 of Figure 2.
Figure 4:
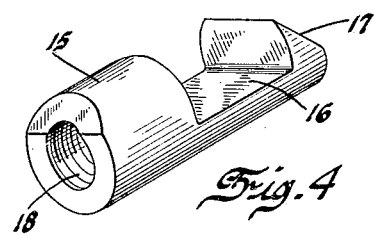
Figure 4 is a detailed perspective view of a plug.

Should it be desirable to remove the accumulated dirt this can be readily done by taking out and cleaning the plugs. However, as before stated, harmful ingredients are usually present only when an engine is new and therefore removal of the plugs probably would never be necessary so long as these harmful particles are collected and retained in the trap. It is to be expected that the dirt will pack itself tightly in the trap and remain so but in the event there are any loose particles they will be retained by the baffle against reentrance into the oil stream, somewhat after the manner illustrated in Figure 2. Here it will be noted that the dirt in the pocket of the plug in the uppermost throw is retained in the lower corner of the space 16 by the end wall or baffle, while the dirt in the pocket of the plug in the lower position of the crank lies well back of the entrance mouth.

It will be understood, of course, that the invention, either in the exact form illustrated or in any such modified embodiment as comes within the scope of appended claims, may be incorporated in other types of engines than that referred to above and in machinery in general.

I claim:

1. In a rotatable element, a fluid passage associated with the element and extending in the general direction of the axis of rotation but eccentric thereto, whereby the heavier particles in the fluid are thrown outwardly against the outermost part of the passage wall under centrifugal force upon rotation of the element and an outlet in the wall of the passage at other than the outermost part thereof so as to reduce the likelihood of such particles passing through the outlet.

2. In a rotatable element, a fluid passage associated with the element and extending in the general direction of the axis of rotation but eccentric thereto, whereby the heavier particles in the fluid are thrown outwardly against the outermost part of the passage wall under centrifugal force upon rotation of the element and an outlet in the wall of the passage at other than the outermost part thereof so as to reduce the likelihood of such particles passing through the outlet and means associated with the outermost part of the passage to receive the heavier particles.

3. In a crank and pitman construction, a pressure feed lubricant passage in the crank extending in the general direction of and offset from the axis of crank rotation, whereby the heavier parts of the lubricant are thrown outwardly against the outer side of the passageway under influence of centrifugal force upon crank rotation, and an outlet passage leading to the pitman bearing on the crank from a part of the first mentioned passageway spaced from such outer side.

4. In a crank and pitman construction, a pressure feed lubricant passage in the crank extending in the general direction of and offset from the axis of crank rotation, whereby the heavier parts of the lubricant are thrown outwardly against the outer side of the passageway under influence of centrifugal force upon crank rotation, and an outlet passage leading to the pitman bearing on the crank from a part of the first mentioned passageway spaced from such outer side, and means associated with the outer side to receive such heavier parts.

5. In a crank and pitman construction, a pressure feed lubricant passage in the crank extending in the general direction of and offset from the axis of crank rotation, whereby the heavier parts of the lubricant are thrown outwardly against the outer side of the passageway under influence of centrifugal force upon crank rotation, and an outlet passage leading to the pitman bearing on the crank from a part of the first mentioned passageway spaced from such outer side, and a trap for collecting such heavier parts.

6. A crankshaft having a lubricant passageway extending longitudinally of the shaft and into the crank pin in an off center relation to the shaft axis, and a second passageway leading outwardly and communicating with the first mentioned passageway at a point spaced from the outermost side thereof with respect to the shaft axis.

7. The structure of claim 6 wherein the first mentioned passageway is provided with means to receive such sediment in the lubricant as is thrown toward the outermost side of the passageway.

8. A crankshaft having a lubricant passageway extending longitudinally of the shaft and into the crank pin in an off center relation to the shaft axis, and a second passageway leading outwardly and communicating with the first mentioned passageway at a point spaced from the outermost side thereof with respect to the shaft axis, and a trap associated with the first mentioned passageway to collect sediment carried by the lubricant in its passage therethrough.

9. The structure of claim 8 wherein the trap involves a sediment receiving space at one end of the passageway having a baffled entrance opening.

10. In a crankshaft or the like, a lubricant passageway extending at an acute angle to the axis of rotation, and a trap at the outermost end of the passageway to collect dirt thrown outwardly under centrifugal action and washed along the outer side of the passageway.

11. The structure of claim 10 wherein the trap involves a closure plug for the outer end of the passageway, having an open space intermediate its ends.

12. In a crankshaft or the like, a lubricant passageway extending in the general direction of the axis of rotation and off center, and a closure plug for the end of the passageway, having an open space intermediate its length to receive dirt particles separated from the lubricant in the passageway and a baffled entrance opening to the space.

13. The structure of claim 12 wherein the plug is removable from the passage to facilitate disposal of accumulated dirt particles.

In testimony whereof I affix my signature.

CALEB E. SUMMERS.